United States Patent
Maddock (10) Patent No.: US 7,506,187 B2
(45) Date of Patent: Mar. 17, 2009

(54) METHODS, APPARATUS AND CONTROLLERS FOR A RAID STORAGE SYSTEM

(75) Inventor: Robert Frank Maddock, Dorset (GB)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/930,356

(22) Filed: Aug. 30, 2004

(65) Prior Publication Data

US 2005/0050381 A1    Mar. 3, 2005

(30) Foreign Application Priority Data

Sep. 2, 2003    (GB) ................... 0320494.8

(51) Int. Cl.
*G06F 1/00*    (2006.01)
(52) U.S. Cl. ............................. 713/310; 714/7; 711/114
(58) Field of Classification Search ................. 713/310; 711/114; 714/6, 7
See application file for complete search history.

(56) References Cited

U.S. PATENT DOCUMENTS

| 5,459,857 A | | 10/1995 | Ludlam et al. | 395/182.04 |
|---|---|---|---|---|
| 5,659,704 A | * | 8/1997 | Burkes et al. | 711/114 |
| 5,666,512 A | * | 9/1997 | Nelson et al. | 711/114 |
| 5,742,792 A | | 4/1998 | Yanai et al. | 395/489 |
| 5,848,230 A | * | 12/1998 | Walker | 714/7 |
| 6,378,038 B1 | * | 4/2002 | Richardson et al. | 711/114 |
| 6,598,174 B1 | * | 7/2003 | Parks et al. | 714/6 |
| 6,807,605 B2 | * | 10/2004 | Umberger et al. | 711/114 |
| 2002/0124139 A1 | * | 9/2002 | Baek et al. | 711/114 |
| 2003/0105829 A1 | * | 6/2003 | Hayward | 709/214 |
| 2003/0196023 A1 | * | 10/2003 | Dickson | 711/1 |
| 2003/0200388 A1 | * | 10/2003 | Hetrick | 711/114 |

* cited by examiner

*Primary Examiner*—Thomas Lee
*Assistant Examiner*—Jaweed A Abbaszadeh
(74) *Attorney, Agent, or Firm*—Harrington & Smith, PC (57) ABSTRACT

Provided are RAID storage systems, methods, and controllers for RAID storage systems. A first method includes storing a first copy of the data in a first RAID array corresponding to a first RAID level providing redundancy (such as RAID-5), and storing a second copy of the data in a second RAID array corresponding to a second RAID level (such as RAID-0) which differs from the first RAID level. Data is read from the two RAID arrays in parallel for improved read performance. A controller is responsive to a disk failure which results in data becoming inaccessible from one of the arrays to retrieve the data from the other one of the arrays. The redundancy within the first RAID array also enables the controller to restore data following a failure of one disk drive by reference to the remaining disk drives of the first array.

10 Claims, 7 Drawing Sheets

METHODS, APPARATUS AND CONTROLLERS FOR A RAID STORAGE SYSTEM

FIELD OF INVENTION

The present invention relates to data storage for a computer system or network of computers, and in particular to methods, apparatus and controllers for a RAID storage system.

BACKGROUND OF THE INVENTION

In data storage systems, an array of independent storage devices can be configured to operate as a single virtual storage device using a technology known as RAID (Redundant Array of Independent Disks—first referred to as a 'Redundant Array of Inexpensive Disks' by researchers at University of California at Berkeley). In this context, 'disk' is often used as a short-hand for 'disk drive'.

A RAID storage system includes an array of independent storage devices and at least one RAID controller. A RAID controller provides a virtualised view of the array of independent storage devices—such that a computer system configured to operate with the RAID storage system can perform input and output (I/O) operations as if the array of independent storage devices of the RAID storage system were a single storage device. The array of storage devices thus appear as a single virtual storage device with a sequential list of storage elements. The storage elements are commonly known as blocks of storage, and the data stored within the data blocks are known as data blocks. I/O operations (such as read and write) are qualified with reference to one or more blocks of storage in the virtual storage device. When an I/O operation is performed on the virtual storage device, the RAID controller maps the I/O operation onto the array of independent storage devices. In order to virtualise the array of storage devices and map I/O operations the RAID controller may employ standard RAID techniques that are well known in the art. Some of these techniques are considered below.

A RAID controller spreads data blocks across the array of independent storage devices. One way to achieve this is using a technique known as Striping. Striping involves spreading data blocks across storage devices in a round-robin fashion. When storing data blocks in a RAID storage system, a number of data blocks known as a strip is stored in each storage device. The size of a strip may be determined by a particular RAID implementation or may be configurable. A row of strips comprising a first strip stored on a first storage device and subsequent strips stored on subsequent storage devices is known as a stripe. The size of a stripe is the total size of all strips comprising the stripe.

The use of multiple independent storage devices to store data blocks in this way provides for high performance I/O operations when compared to a single storage device, because the multiple storage devices can act in parallel during I/O operations. Performance improvements are one of the major benefits of RAID technology. Hard disk drive performance is important in computer systems, because hard disk drives are some of the slowest internal components of a typical computer.

Physical storage devices such as storage devices are known for poor reliability, and yet hard disk drive reliability is critical because of the serious consequences of an irretrievable loss of data (or even a temporary inaccessibility of data). An important purpose of typical RAID storage systems is to provide reliable data storage.

One technique to provide reliability involves the storage of check information along with data in an array of independent storage devices. Check information is redundant information that allows regeneration of data which has become unreadable due to a single point of failure, such as the failure of a single storage device in an array of such devices. Unreadable data is regenerated from a combination of readable data and redundant check information. Check information is recorded as 'parity' data which may occupy a single strip in a stripe, and is calculated by applying the EXCLUSIVE OR (XOR) logical operator to all data strips in the stripe. For example, a stripe comprising data strips A, B and C would have an associated parity strip calculated as A XOR B XOR C. In the event of a single point of failure in the storage system, the parity strip is used to regenerate an inaccessible data strip. If a stripe comprising data strips A, B, C and PARITY is stored across four independent storage devices W, X, Y and Z respectively, and storage device X fails, strip B stored on device X would be inaccessible. Strip B can be computed from the remaining data strips and the PARITY strip through an XOR computation. This restorative computation is A XOR C XOR PARITY=B. This exploits the reversible nature of the XOR operation to yield any single lost strip, A, B or C. Of course, the previous XOR can be repeated if the lost data is the PARITY information.

In addition to striping (for the performance benefits of parallel operation) and parity (for redundancy), another redundancy technique used in some RAID solutions is mirroring. In a RAID system using mirroring, all data in the system is written simultaneously to two hard disk drives. This protects against failure of either of the disks containing the duplicated data and enables relatively fast recovery from a disk failure (since the data is ready for use on one disk even if the other failed). These advantages have to be balanced against the disadvantage of increased cost (since half the disk space is used to store duplicate data). Duplexing is an extension of mirroring that duplicates the RAID controller as well as the disk drives—thereby protecting against a failure of a controller as well as against disk drive failure.

Different RAID implementations use different combinations of the above techniques. A number of standardized RAID methods are identified as single RAID "levels" 0 through 7, and "nested" RAID levels have also been defined. For example:

RAID 1 uses mirroring (or duplexing) for fault tolerance; whereas

RAID 0 uses block-level striping without parity—i.e. no redundancy and so without the fault tolerance of other RAID levels, and therefore good performance relative to its cost; RAID 0 is typically used for non-critical data (or data that changes infrequently and is backed up regularly) and where high speed and low cost are more important than reliability;

RAID 3 and RAID 7 use byte-level striping with parity; and

RAID 4, RAID 5 and RAID 6 use block-level striping with parity. RAID 5 uses a distributed parity algorithm, writing data and parity blocks across all the drives in an array (which improves write performance slightly and enables improved parallelism compared with the dedicated parity drive of RAID 4). Fault tolerance is maintained in RAID 5 by ensuring that the parity information for any given block of data is stored on a drive separate from the drive used to store the data itself. RAID 5 combines good performance, good fault tolerance and high capacity and storage efficiency, and has been considered the best compromise of any single RAID level for applications such as transaction processing and other applications which are not write-intensive.

In addition to the single RAID levels described above, nested RAID levels are also used to further improve performance. For example, features of high performance RAID 0 may be combined in a nested configuration with features of redundant RAID levels such as 1, 3 or 5 to also provide fault tolerance.

RAID 01 is a mirrored configuration of two striped sets, and RAID 10 is a stripe across a number of mirrored sets. Both RAID 01 and RAID 10 can yield large arrays with (in most uses) high performance and good fault tolerance.

A RAID 15 array can be formed by creating a striped set with parity using multiple mirrored pairs as components. Similarly, RAID 51 is created by mirroring entire RAID 5 arrays—each member of either RAID 5 array is stored as a mirrored (RAID 1) pair of disk drives. The two copies of the data can be physically located in different places for additional protection. Excellent fault tolerance and availability are achievable by combining the redundancy methods of parity and mirroring in this way. For example, an eight drive RAID 15 array can tolerate failure of any three drives simultaneously. After a single disk failure, the data can still be read from a single disk drive—whereas RAID 5 would require a more complex rebuild.

However, the potential benefits of nested RAID levels must generally be paid for in terms of cost, complexity and low storage efficiency. Complexity has consequences for management and maintenance. A minimum of 6 identical hard disk drives (and possibly specialized hardware or software or multiple systems) are required for a RAID 15 or RAID 51 implementation. The performance of RAID 51, measured in throughput of disk operations per second, is low given the number of disks employed. This is because each write operation requires a read of the old data, a read of the old parity, and then four write operations.

Therefore, although RAID offers significant advantages over single hard disk drives, such as the potential for increased capacity, performance and reliability, there are also significant costs and other trade-offs involved in implementing a RAID system. Some of the benefits of different RAID levels have been obtained by designing arrays that combine RAID techniques in nested configurations, but the success of such implementations has been balanced by increased costs and complexity. For this reason, many single level RAID solutions are still in productive use.

SUMMARY

A first embodiment of the invention provides a method of operating a RAID storage system comprising the steps of: storing a first copy of the data in a first array of disk drives in accordance with a first RAID level providing redundancy; and storing a second copy of the data in a second array of disk drives in accordance with a second RAID level which differs from the first RAID level. If a disk failure in one array results in data becoming inaccessible from that array, the data can be retrieved from the other one of the arrays. The redundancy within the first RAID array enables recovery of the first array from a failure of one of its disks by reference to the remaining disk drives of the first array.

The second array of disk drives preferably implements striping of data across the disk drives of the array without redundancy, such as in RAID-0. The first array of disk drives implements redundancy, and preferably implements block-level striping with parity (such as in RAID-4, RAID-5 and RAID-6). The replication of data between the first and second arrays provides additional redundancy to that provided within the first array.

In one embodiment, data is stored in the first array by block-level striping of data across the disk drives of the array, with parity information for data blocks being distributed across disk drives of the array other than the disk drives storing the corresponding data blocks—such as in RAID-5. In this embodiment, the RAID level of the second array is RAID-0. In such an embodiment, double redundancy is achieved—and so reliability is better than if RAID-5 is implemented alone. In the embodiment, a write operation requires two reads and three writes—giving increased throughput compared with a RAID-51 implementation, even though one less disk drive is employed. After a disk failure in one array, data can still be read from the other array with one read operation.

Although RAID-51 protects against any three failures, double redundancy is sufficient for many applications, including many business-critical data processing applications, since double redundancy combined with a prompt repair strategy reduces the likelihood of any data loss to a very low level (unless the disk drives are very unreliable).

According to a further embodiment of the invention, a RAID-5 array and a RAID-0 array are located in different places for added protection, and can be implemented together with recovery techniques such as hot swapping or hot spares for applications which require high performance at all times and applications where loss of data is unacceptable.

In another embodiment, the RAID-0 array is used in combination with a RAID-4 array (which implements block-level striping with dedicated parity).

The steps of storing a first and a second copy of the data may be performed in parallel, and read operations may be allocated between the arrays in accordance with workload sharing. In a first embodiment, the storing and retrieval are performed under the control of a single RAID controller which manages the two disk drive arrays in parallel despite the arrays having different RAID levels. The single RAID controller is able to manage the simultaneous occurrence of a disk failure in each of the arrays.

In another embodiment, a separate RAID controller is used for each of the first and second arrays. Two cooperating RAID controllers can be advantageous when the first and second arrays are located in different locations. A separate coordinator (which may be implemented in software) can be used to manage the cooperation between two RAID controllers, or cooperation may be coordinated by the two RAID controllers themselves.

A further embodiment provides a RAID storage system, comprising: a first array of disk drives corresponding to a first RAID level providing redundancy; a second array of disk drives corresponding to a second RAID level which differs from the first RAID level; and at least one controller for controlling storing of a first copy of data in the first array and storing of a second copy of the data in the second array. The controller controls retrieval of stored data by disk access operations performed on the first and second arrays, and is responsive to a disk failure resulting in data becoming inaccessible from one of said arrays to retrieve the data from the other one of said arrays.

The 'at least one controller' may comprise first and second cooperating RAID controllers, including a first RAID controller for managing storing and retrieval of data for the first array and a second RAID controller for managing storing and retrieval of data for the second array.

Embodiments of the invention provide RAID storage systems and methods of operating such systems which combine the benefits of different RAID levels, while improving performance relative to reliability, cost and complexity when compared with typical nested RAID configurations. The performance and reliability characteristics of a RAID storage system according to an embodiment of the invention are particularly beneficial for applications in which double-redundancy is sufficient, and yet better performance is desired than is achievable with known RAID-51 or RAID-15 implementations.

In an alternative embodiment, the first RAID array implements a nested configuration of RAID levels and the second RAID array implements non-redundant RAID-0.

A further embodiment provides a RAID controller comprising: means for controlling storing of a first copy of data in a first RAID array using a redundant storage technique corresponding to a first RAID level, to provide redundancy within the first array; means for controlling storing of a second copy of the data in a second array of disk drives using a storage technique corresponding to a RAID level different from said first RAID level; and means for controlling retrieval of stored data by disk access operations performed on the first and second arrays and, in response to a disk failure resulting in data becoming inaccessible from a first one of said arrays, for controlling retrieval of the data from the other one of said arrays.

The RAID controller may control storing of a second copy of the data in a second array of disk drives using a non-redundant storage technique. The RAID controller may control retrieval of stored data by disk access operations performed in parallel on the first and second arrays. The RAID controller may be implemented as a program product, or using dedicated hardware.

BRIEF DESCRIPTION OF DRAWINGS

One or more embodiments of the invention are described below in detail, by way of example, with reference to the accompanying drawings in which.

DETAILED DESCRIPTION OF EMBODIMENTS

Disk Drive Overview

The components of a typical computer's hard disk drive are well understood by persons skilled in the art and will not be described in detail herein. In brief, a hard disk drive stores information in the form of magnetic patterns in a magnetic recording material which coats the surface of a number of discs ("platters"). The platters are stacked on a central spindle and are rotated at high speed by a spindle motor. Electromagnetic read/write heads are mounted on sliders and used both to record information onto and read data from the platters. The sliders are mounted on arms which are positioned over the surface of the platter by an actuator. An electronic circuit board and control program (located within the disk drive and hereafter collectively referred to as the disk controller) cooperate to control the activity of the other components of the disk drive and communicate with the rest of the computer via an interface connector (such as an SCSI connector).

To allow for easier and faster access to information within a disk drive, each platter has its information recorded in concentric circles (tracks) and each track is divided into a number of sectors (each of which holds 512 bytes of the total tens of billions of bits of information which can be held on each surface of each platter within the disk drive).

The extreme miniaturization of the components of a typical disk drive, with ever-increasing requirements for increased performance and increased data density for improved capacity, have resulted in disk drives being more prone to errors than many other components of a computer. Because hard disk drives are where the computer stores data and play an important in overall computer system performance, both the reliability and performance of the hard disk drive are critical in typical computer systems.

The following is a simplified example of the operations involved each time a piece of information is read from a conventional disk drive (ignoring factors such as error correction):

1. An application program, operating system, system BIOS, and any special disk driver software work together to process a data request to determine which part of the disk drive to read;
2. The location information undergoes one or more translation steps and then a read request (expressed in terms of the disk drive geometry—i.e. cylinder, head and sector to be read) is sent to the disk drive over the disk drive connection interface;
3. The hard disk drive's disk controller checks whether the information is already in the hard disk drive's cache—if within the cache, the disk controller supplies the information immediately without looking on the surface of the disk;
4. If the information is not in the cache and the disks of the drive are not already spinning, the disk drive's disk controller activates the spindle motor to rotate the disks of the drive to operating speed;
5. The disk controller interprets the address received for the read, and performs any necessary additional translation steps that take into account the particular characteristics of the drive; the hard disk drive's disk controller then looks at the final number of the cylinder requested to identify which track to look at on the surface of the disk;
6. The disk controller instructs the actuator to move the read/write heads to the appropriate track;
7. When the heads are in the correct position, the disk controller activates the specific head in the required read location and the heads begin reading the track—looking for the sector that was requested while the disk is rotated underneath the head;
8. When the correct sector is found, the head reads the contents of the sector;
9. The disk controller coordinates the flow of information from the hard disk drive into a temporary storage area and then sends the information over the disk drive connection interface (usually to the computer system's memory) to satisfy the request for data.

RAID Storage System

RAID storage systems use multiple hard disk drives in an array for faster performance and/or improved reliability through redundancy (without requiring very expensive specialized, high capacity disk drives). The RAID storage system 10 described below, and shown schematically in FIG. 1, uses a combination of a RAID-5 array 20, a RAID-0 array 30, and a RAID controller 40 which manages the two arrays cooperatively to obtain desired performance and reliability characteristics. A read instruction from the RAID controller 40 initiates the above-described sequence of read operations controlled by a disk controller within a disk drive. Similarly, the RAID controller 40 initiates write operations by sending a write instruction to a disk drive. The raid controller 40 is shown bidirectionally coupled to a block 5, such as a PC or a server.

RAID-0 and RAID-5 Arrays

Figure 1:
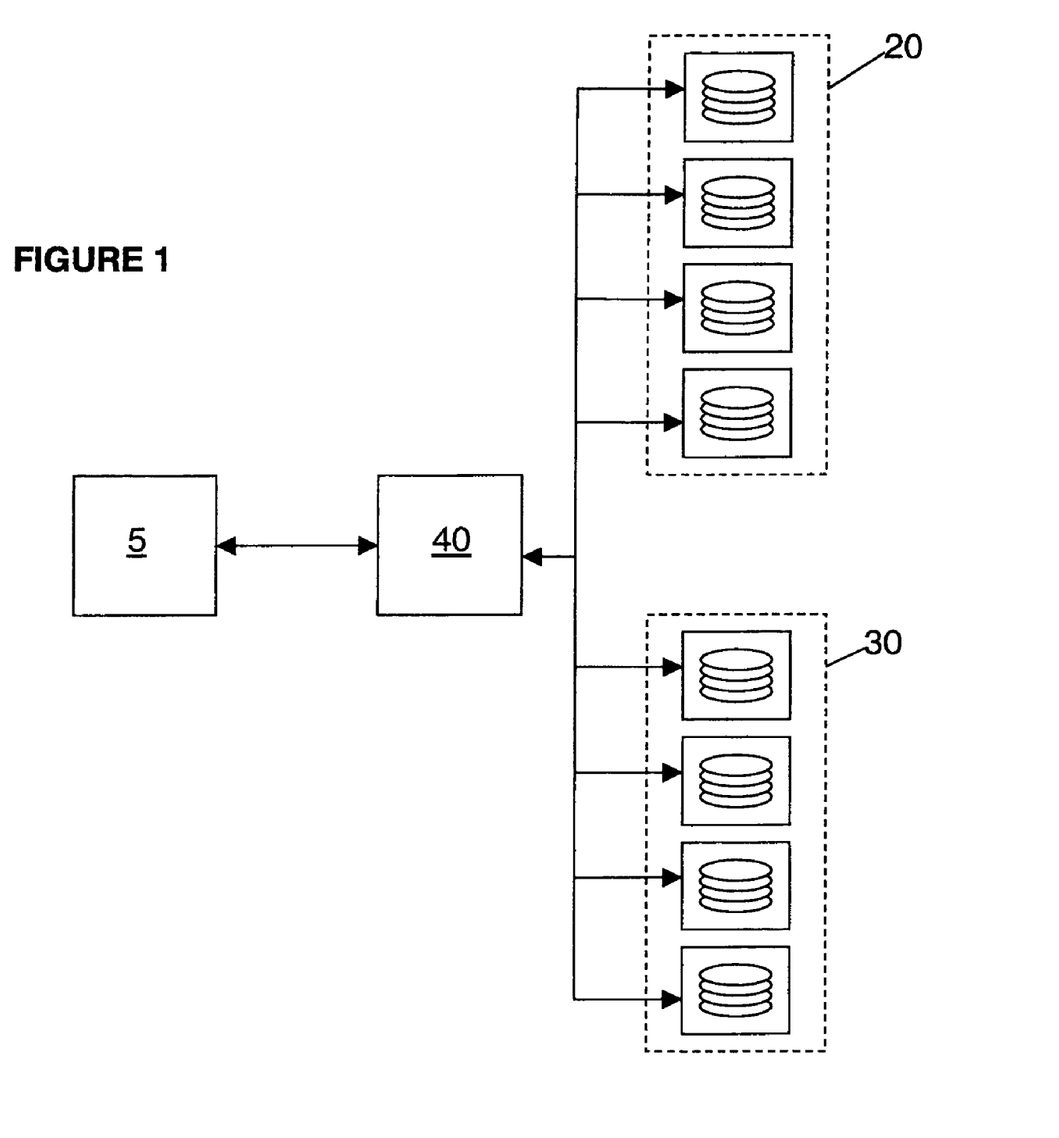
FIG. 1 is a schematic representation of a RAID controller connected to a pair of arrays, according to an embodiment of the invention.

The RAID arrays 20,30 used in the RAID storage system 10 can be conventional RAID-0 and RAID-5 arrays.

Figure 2:
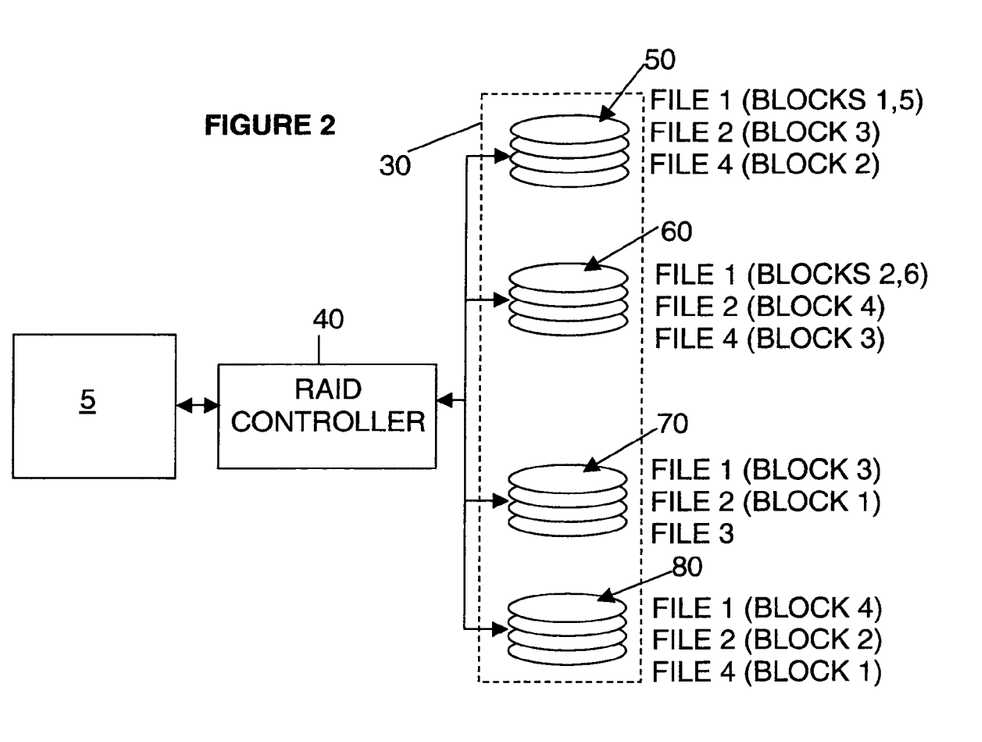
FIG. 2 is a schematic representation of an example of striping of data, such as in a RAID-0 array.

The RAID-0 array 30 uses block-level striping of data across the disk drives within the array without storing parity information. FIG. 2 shows, in schematic form, an example RAID striping configuration. A RAID controller 40 (implemented in hardware, software, or a combination) splits files into blocks and distributes the blocks across several hard disk drives 50,60,70,80 in a round-robin manner. The block size determines how the file is divided up. In the example shown, the first block of file 1 is sent to a first disk drive 50, then the second block to a second disk drive 60, etc. After one block of file 1 has been allocated to each of the four disk drives, the fifth block is stored on the first disk drive 50, the sixth block on the second drive 60, and so on. This continues until the whole file is stored. Some files may be smaller than the block size, such that they are stored on one disk drive.

Figure 3:
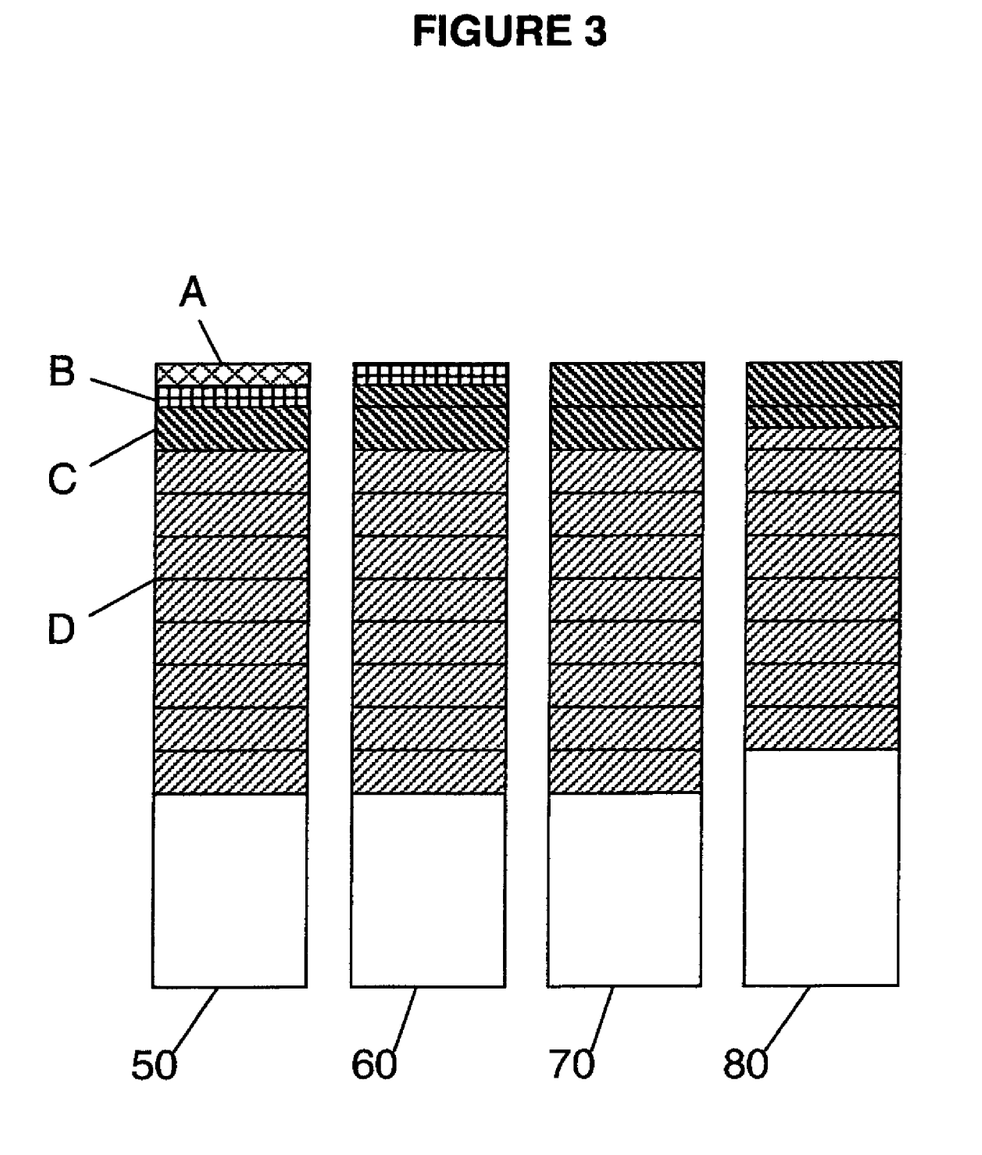
FIG. 3 is a representation of an example of non-redundant data block striping, such as in a RAID-0 array.

FIG. 3 shows an example of data striping of files of different sizes between drives on a four-disk-drive, 16 kilobyte (kB) stripe size RAID-0 array. A first file labelled A is 8 kB in size. A second file labelled B is 16 kB. A third file labelled C is 96 kB. A fourth file D is 504 kB in size.

Figure 4:
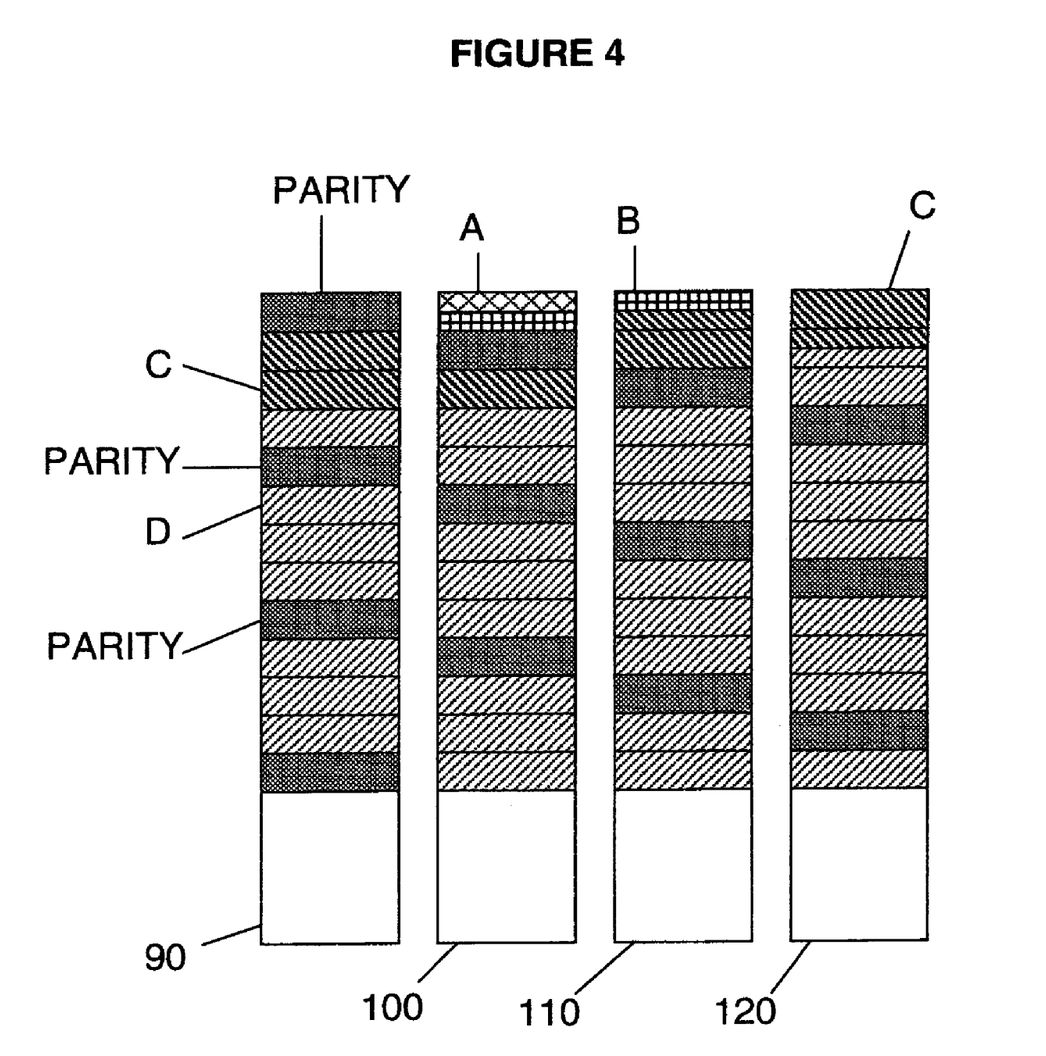
FIG. 4 is a representation of an example of data block striping with distributed parity, such as in a RAID-5 array.

The RAID-5 array uses block level striping with parity information distributed across the disk drives in the array—striping both data and parity information across three or more drives. The parity information for a given block of data is placed on a drive separate from the drive(s) used to store the data itself. FIG. 4 illustrates a number of files distributed between the disk drives 90,100,110,120 of a four-disk-drive RAID-5 array (using, for example, a 16 kB stripe size). A first file labelled A is 8 kB in size; a second file labelled B is 16 kB in size; a third file is 96 kB in size and a fourth file is 504 kB in size. The RAID-5 array can tolerate loss of one of the drives in the array without loss of data (although performance is affected if a disk drive fails, due to reduced parallelism).

RAID Controller

The RAID controller of the RAID storage system is located outside the individual disk drives and communicates with the disk drives via their connection interface (the RAID controller is separate from the disk controller referred to above). The RAID controller can be a conventional RAID controller which is programmed (or, equivalently, control circuitry is modified) to manage the two arrays described above cooperatively and in parallel. In an alternative embodiment, a coordinator component is used to manage cooperation between two separate, conventional RAID controllers which each manage one of the two arrays.

Many RAID implementations use dedicated hardware including a dedicated processor to control the array. In a typical personal computer (PC), a specialized RAID controller is installed into the PC and the disk drives of the array are connected to the RAID controller. The RAID controller interfaces to the drives using SCSI or IDE/ATA and sends data to the rest of the PC over a system bus. Some motherboards (e.g. those intended for server systems) include an integrated RAID controller instead of a bus-based card. In higher-end systems, the RAID controller may be an external device which manages the drives in the array and then presents the logical drives of the array over a standard interface (e.g. using SCSI) to the server using the array. The server uses the array or arrays as if the arrays are just one or more fast hard disk drives.

In some RAID implementations, such as where cost is more of an issue than performance, RAID controllers are implemented in software (usually within the operating system) which controls the system processor to perform the various functions required to manage the RAID array. However, software-only RAID controller implementations can put a significant load on the system processor when computing parity.

In the present embodiment, a RAID controller including a dedicated processor and control circuitry has been programmed to manage storing and data retrieval using separate RAID-0 and RAID-5 arrays. A conventional RAID controller that is capable of RAID-0 and RAID-5 can be programmed in this way.

The RAID controller of this embodiment includes a dedicated data processing unit, and a data storage unit for storing data to be processed by the data processing unit and for storing data resulting from processing by the data processing unit. A control program within the RAID controller sends read and write instructions to the data processing unit, which performs address translation and computes parity information and sends read and write control instructions to the plurality of disk drive arrays.

Figure 5:
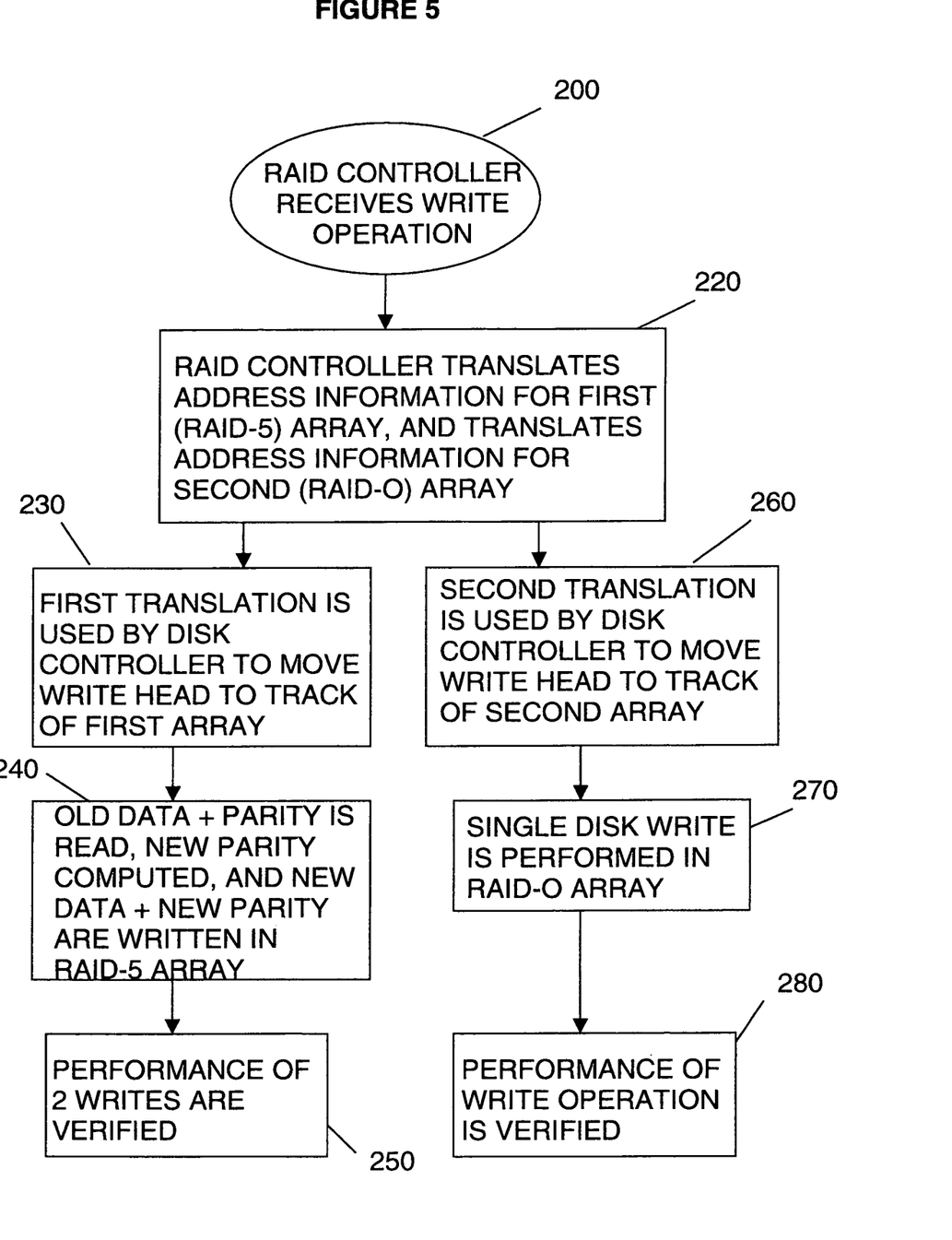
FIG. 5 is a flow diagram showing a sequence of steps of a write operation according to an embodiment of the invention.

Performing a write operation involves writing data to the RAID-0 array and to the RAID-5 array. As shown in FIG. 5, the RAID controller receives 200 a write instruction and translates 220 received address information to block addresses of the first (RAID-5) array. The RAID controller also translates 220 the received address information to generate address information for the second (RAID-0) array.

The RAID controller then controls the two disk drive arrays in parallel, sending the first translated block address information to a respective disk drive which translates 230 the block address(es) to a physical head and track address and controls 230 movement of a write head to an appropriate track of the first array. The second translated address information is sent to a disk drive of the second array, and a disk controller translates 260 the block address to a physical address and uses the address information to move 260 a write head to the appropriate track of the second array.

Although the RAID controller initiates two separate write operations (one for each array), the sequence of operations performed for each array is conventional. The write to the RAID-0 array is a single disk write 270. A typical short write 240 to the RAID-5 array includes a read of the old data, a read of the corresponding old parity, and then a write of the new data and computation and write of the new parity. The write operation for the pair of arrays is only complete when all of these operations have been completed and verified 250, 280. In this embodiment, interruptions and errors during a write operation (when data is only partially written) are handled using techniques which are well known for use in other RAID arrays.

A read operation can be performed by reading required data from either the RAID-5 array or the data copy in the RAID-0 array. In the present embodiment, both arrays are used during read operations, switching between the arrays to perform reads to balance the workload between the arrays and maximize throughput. Since the RAID-5 array has lower throughput than the RAID-0 array, command queue length is maintained equal between the two arrays (improving performance compared with simply alternating consecutive reads). Alternative embodiments use other known load sharing and/or load balancing techniques.

If a read from one copy of the data fails, the data is read from the other copy and then rewritten to the failing array to restore full redundancy. As is known for conventional RAID systems, some read failures can be resolved by a simple retry, whereas other failures require a rebuild of corrupted/lost data or disk drive replacement. The determination of when to perform data rebuild or disk drive replacement is carried out using conventional operations for RAID systems.

Figure 6A:
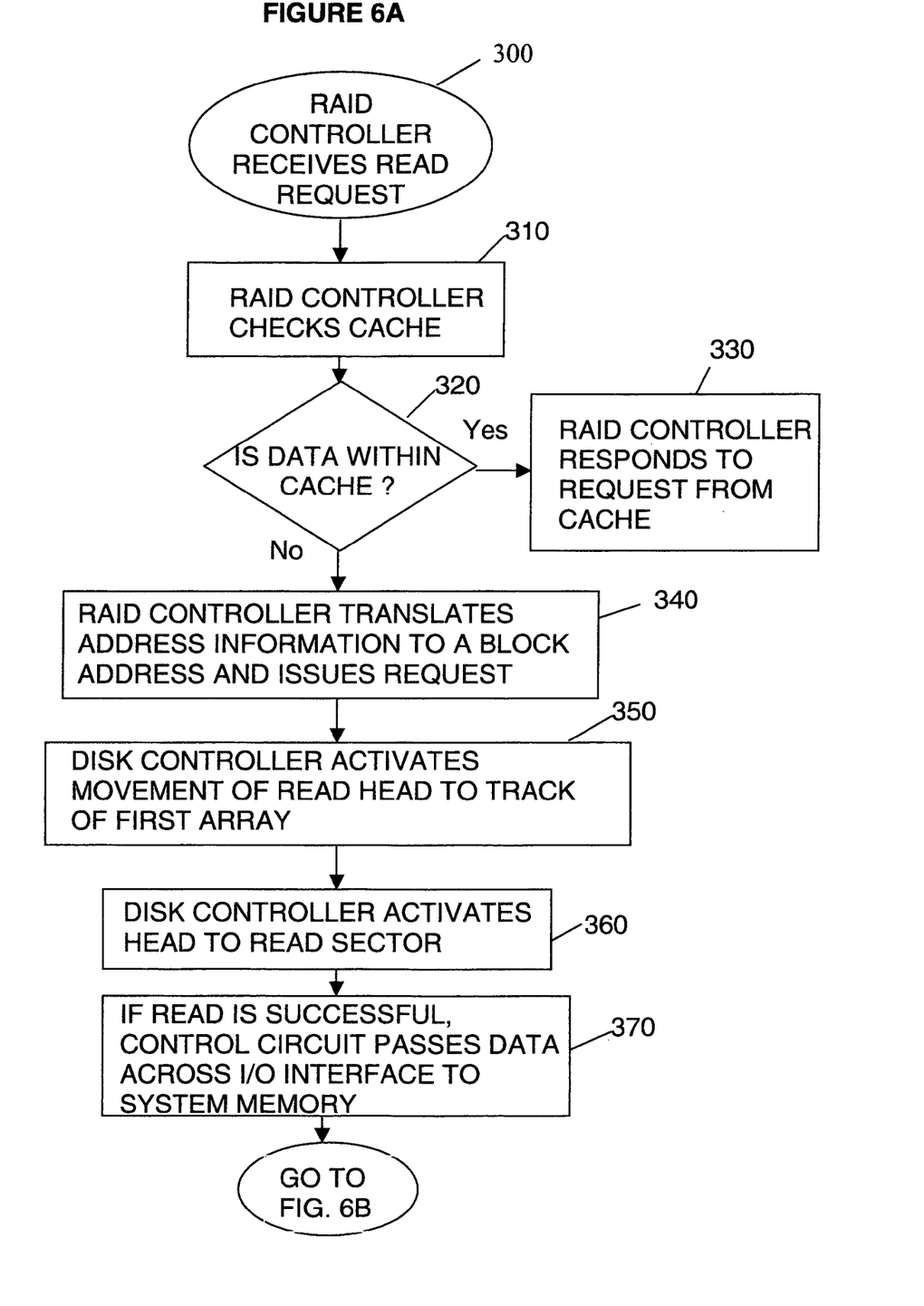
FIG. 6 is a flow diagram showing a sequence of steps of a read operation according to an embodiment of the invention.
Figure 6B:
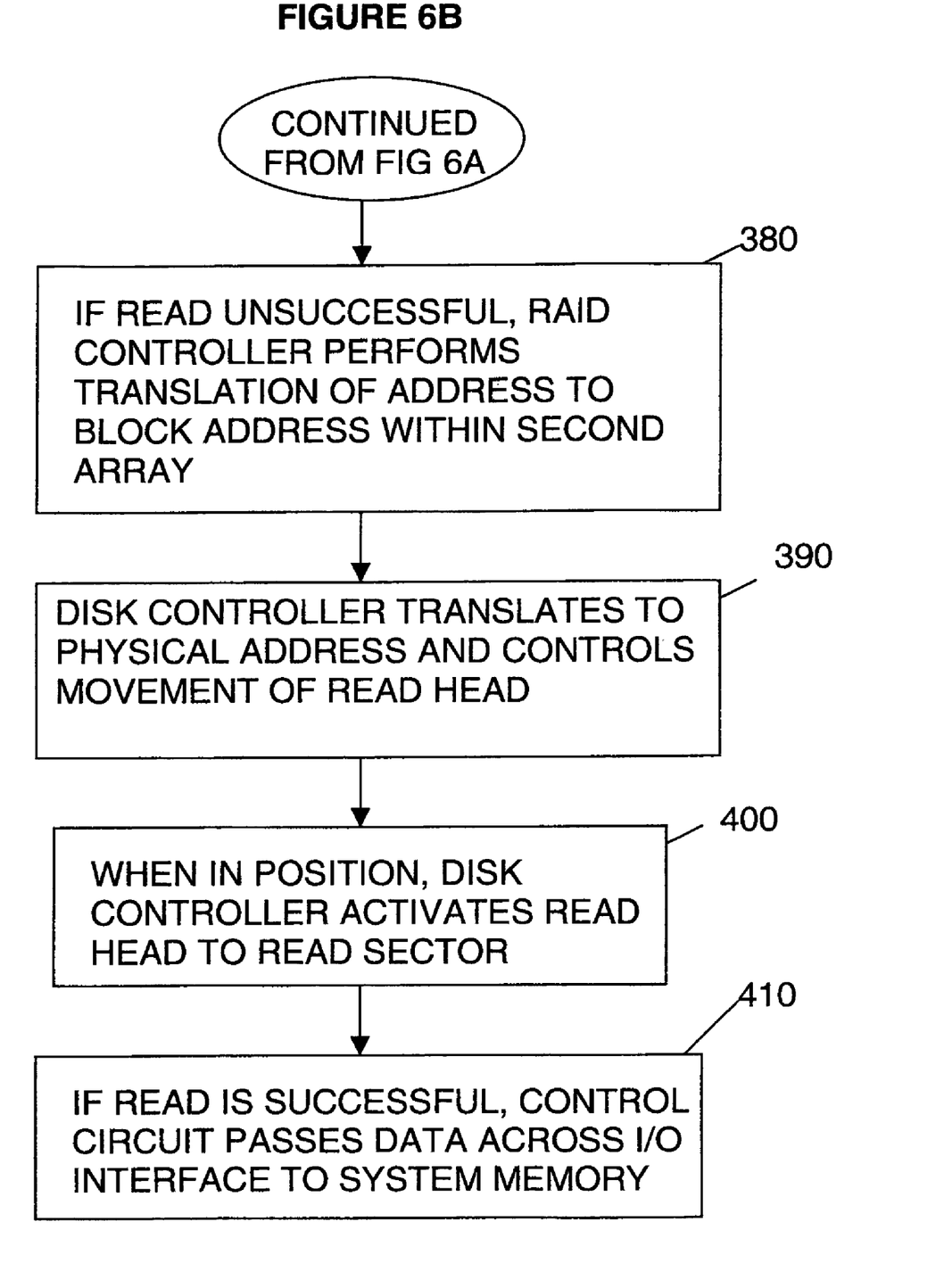

FIG. 6 shows a sequence of steps of a read operation. The steps prior to the RAID controller receiving a read request are conventional. After receiving 300 the read request, the RAID controller checks 310 cache storage of the RAID storage system to determine whether the requested data is within the cache. If the data is found 320 in the cache, the RAID controller provides 330 the requested data (the disk controller passes the data across the disk drive's connection interface to the computer system's main memory). If the system includes multiple RAID controllers, each RAID controller may be associated with its own separate cache.

If the data was not within the cache(s), the RAID controller translates 340 address information to one or more block addresses of one or more disk drives and issues a read request to the relevant disk drive (within either the first or second array). A disk controller of the selected disk drive performs 350 a further translation of the block address(es) to one or more physical head/track address(es) and activates movement of the read head to the appropriate track of the array. When the head is in position, the disk controller activates 360 the read head to read the sector holding the requested data. If the read is successful, the disk controller passes 370 the data via its control circuit board across the I/O connection interface to system memory.

If a read is unsuccessful, the RAID controller performs 380 an alternative address translation to generate a block address for the other one of the first and second RAID arrays, and sends a read instruction to the appropriate disk drive. A disk controller of the identified disk drive determines 390 a physical address and moves a read head to the appropriate position. The disk controller then activates 400 the head to read the appropriate recording track sector, and the control circuit passes 410 the data across the I/O connection interface.

If a disk in the RAID-5 array fails, the relevant drive is replaced (either manually or automatically by a "hot spare"—described later). The data is then reconstructed onto that new disk drive. The data can be obtained by reading all the remaining operational disk drives of the RAID-5 array (reading the data and parity information, performing an XOR and writing the result to a spare disk—as in conventional RAID-5 storage systems) or by reading the data from the RAID-0 array. The latter approach has the advantage of fewer disk operations (another advantage over mirrored RAID-5 arrays). Also, if more than one disk drive in the RAID-5 array fails, the data can still be reconstructed onto the RAID-0 array from the RAID-0 array. If a disk drive in the RAID-0 array fails, the disk drive is replaced and the data reconstructed by reading the RAID-5 array.

Restore operations are handled in a similar manner to restore in other RAID arrays. A disk drive may totally fail—such as in the case of a mechanical failure. In this case, all operations intended to be performed on the disk drive also fail and the disk drive is replaced. If a single read operation fails, the data block is reassigned to another part of the disk drive, the data block is written at the new location and a read check is performed. If the rewritten data can be read, the disk drive is not replaced as a result of the first read failure. However, if read failures occur frequently (or more than a threshold number of times), the disk drive is considered unreliable and is replaced.

A combination of cooperating RAID-5 and RAID-0 arrays as described above can provide better availability than conventional RAID-5 and better performance with one less disk drive than RAID-51 (which involves two copies of the data, each on a RAID-5 array, and hence requires twice the number of disk operations as RAID-5).

Protection against three disk failures (before a rebuild) is achievable with known RAID-51, but analysis of failure rates by the present inventor suggests that storage systems according to an embodiment of the present invention can provide satisfactory reliability without such 'triple-redundancy'. Table 1 (below) shows the number of disk read/write operations involved in normal operation, the number of disk drives used, and the number of disk failures without data loss for the cooperating RAID-0 and RAID-5 arrays described above compared with the known RAID-5 and RAID-51 solutions.

TABLE 1

|  | RAID-5 | RAID-51 | Cooperating RAID-0 + RAID-5 |
|---|---|---|---|
| Number of disk operations: | | | |
| For a read: | 1R | 1R | 1R |
| For a write: | 2R + 2W | 2R + 4W | 2R + 3W |
| Number of disk drives used (for N disk drives capacity of user's data): | | | |
|  | N + 1 | 2N + 2 | 2N + 1 |
| Number of disk failures without data loss: | | | |
|  | 1 | 3 | 2 |

An embodiment involving cooperating RAID-0 and RAID-5 arrays as described above could also handle some combinations of three or more disk failures before a repair is completed (but not where a RAID-5 disk and the disk holding its parity information, and the disk holding the corresponding data copy in the RAID-0 array all fail simultaneously).

INDUSTRIAL APPLICABILITY AND RECOVERY

A doubly-redundant RAID solution according to the present invention provides acceptable performance, reliability and availability for many business applications. The probability of data loss depends on repair time as well as disk failure rate, but protection against two failures before a repair is often satisfactory.

In particular, fault tolerance and performance can be further improved by the use of techniques such as hot swapping and hot spares. If a drive fails in one of the RAID arrays, it is desirable to replace the drive as soon as possible so that the array can be returned to normal operation. If the RAID-5 array is running in a degraded mode due to a drive failure, the fault tolerance and performance of the array will be reduced until the drive is replaced. It is known within some RAID systems to alleviate problems of degraded reliability and performance using hot swapping and hot spares. Hot swapping enables replacement of a failed drive, and rebuilding data onto the replacement drive, without the system being taken out of productive use. Another approach is to attach spare drives to the controller and to leave them in a 'standby' mode. If a failure occurs, the controller can use the spare drive as a replacement for the failed drive. In some implementations, the controller can disable a failed drive and rebuild data onto the "hot spare" drive automatically.

As noted above, alternative embodiments of the invention may combine a RAID-0 array with a RAID-4 array. The single RAID controller described above may be replaced by a pair of cooperating RAID controllers—which may be conventional RAID controllers relying on an additional coordinator program to manage the cooperation between them. Also, RAID storage systems can themselves be virtualised in configurations such as storage area networks (SANs). A SAN comprises a network linking one or more servers to one or more storage devices. Storage devices in a SAN may include virtual storage devices implemented as RAID storage systems, and so an embodiment of the present invention can be implemented within a SAN.

What is claimed is:

1. A method of operating a RAID storage system, comprising:
   storing a first copy of data in a first array of disk drives in accordance with a first RAID level providing redundancy;
   storing a second copy of the data in a second array of disk drives in accordance with a second RAID level which differs from the first RAID level;
   reading stored data by disk access operations performed on the first and second arrays; and
   in response to a disk failure resulting in data becoming inaccessible from a first one of said arrays, reading the data from the other one of said arrays and restoring the data to the one of said arrays affected by the disk failure by copying the data from the other one of said arrays.

2. A method according to claim 1, further comprising:
   sharing a read operation workload between the first and second arrays by performing a set of disk access operations in parallel on the first and second arrays.

3. A method according to claim 1, wherein storing the second copy of the data comprises performing non-redundant striping of data across the disk drives of the second array.

4. A method according to claim 1, wherein storing the first copy of the data comprises performing block-level striping of data across disk drives of the first array and storing parity information on one or more disk drives of the first array.

5. A method according to claim 4, including distributing parity information across disk drives of the first array.

6. A method to operate a RAID storage system, comprising:
   storing a first copy of data in a first array of disk drives in accordance with a first RAID level providing redundancy;
   storing a second copy of the data in a second array of disk drives in accordance with a second RAID level which differs from the first RAID level; and
   in response to data becoming inaccessible for reading from a first one of said arrays, reading the data from the other one of said arrays and restoring the data to the affected one of said arrays by copying the data from the other one of said arrays.

7. A method according to claim 6, further comprising:
   sharing a read operation workload between the first and second arrays comprising performing a set of disk access operations in parallel on the first and second arrays.

8. A method according to claim 6, wherein storing the second copy of the data comprises performing non-redundant striping of data across disk drives that comprise the second array.

9. A method according to claim 6, wherein storing the first copy of the data comprises performing block-level striping of data across disk drives that comprise the first array; and storing parity information on at least one disk drive that comprises at least part of the first array.

10. A method according to claim 6, wherein storing the first copy of the data comprises performing block-level striping of data across disk drives that comprise the first array; and distributing parity information across disk drives that comprise the first array.

* * * * *